United States Patent [19]
Gehrke

[11] 3,937,311
[45] Feb. 10, 1976

[54] OVERRUNNING CLUTCH

[75] Inventor: Gerard William Gehrke, Litchfield, Conn.

[73] Assignee: The Torrington Company, Torrington, Conn.

[22] Filed: May 20, 1974

[21] Appl. No.: 471,204

[52] U.S. Cl. ................................. 192/45
[51] Int. Cl.² ........................................ F16D 15/00
[58] Field of Search ................ 192/45; 188/82, 84

[56] References Cited
UNITED STATES PATENTS

| | | | |
|---|---|---|---|
| 3,249,186 | 5/1966 | Kluwe | 192/45 |
| 3,403,762 | 10/1968 | Auriol | 192/45 |
| 3,548,982 | 12/1970 | Soloviev | 192/45 |

Primary Examiner—Allan D. Herrmann
Attorney, Agent, or Firm—Frank S. Troidl

[57] ABSTRACT

This is an overrunning roller clutch, including a biasing member for urging rollers to lock or unlock the clutch depending on the direction of relative rotation of the clutch rotatable members, one of which is cylindrical while the other has cam surfaces. The biasing member generates axial forces on at least one of the rollers. These axial forces acting on the key rollers cause the entire roller complement to move into or out of the engaged position depending upon the relative rotation of the shaft and outer member.

6 Claims, 9 Drawing Figures

OVERRUNNING CLUTCH

This invention relates to overrunning clutches. More particularly, this invention is a novel overrunning clutch including biasing means for exerting an axial force against rolling members in the overrunning clutch.

Most overrunning roller clutches use a cage with springs which act on each of the rollers to urge them circumferentially towards their engaged position. The cage is expensive to manufacture, difficult to assemble into the clutch, and it limits the number of rollers that can be incorporated in the space between the raceways.

With overrunning clutches of a given size, the more rollers that can be fitted in the space between the raceways, the greater the torque capacity. Since cages take up circumferential space, fewer rollers can be used in an overrunning clutch of that particular design than could be used if there were no retainer.

My invention eliminates the need for the cage. At least one, and usually three or more rollers of a full complement clutch can be axially loaded to insure proper roller engagement when either raceway is rotated in its relative locking direction.

Briefly described, my invention includes a biasing member such as a spring, which exerts a light axial force on key rollers to hold these rollers against an axial stop on the cylindrical clutch race. These rollers then act on the intermediate rollers. The effect is that the rollers tend to stay with and move with the cylindrical race. Rotation of said race drags the rollers into locking engagement or overrunning position depending on which direction the race is rotated. Alternatively, the cammed race may be rotated relative to the cylindrical race and rollers.

The invention, as well as its many advantages, may be further understood by reference to the following detailed description and drawings in which.

Like numbers refer to like parts throughout the various figures.

Figure 1:
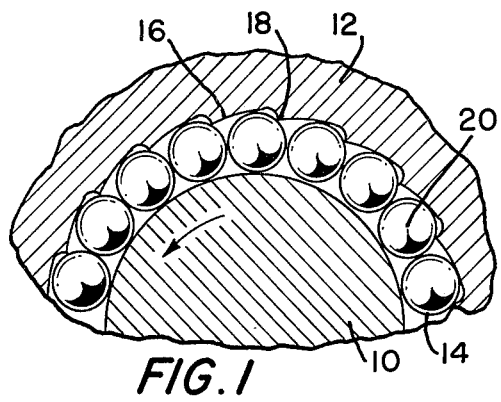
FIG. 1 is a sectional elevational view showing a portion of a full complement overrunning roller clutch with cam surfaces on the outer race.

Referring to the drawings, and more particularly, to FIG. 1, the overrunning clutch includes an inner member, or shaft 10, and an outer member, or case 12. The diameter of the shaft is less than the inside diameter of the case, thus providing an annular space 14 between the shaft and the case.

A cam surface comprising a plurality of ramps 16, each provided with stops 18, extends circumferentially around the inside of the case 12. Rolling members, such as rollers 20, are mounted in the annular space between the shaft 10 and the case 12. The rolling members may also be balls.

The shaft 10 is rotatable and case 12 is also rotatable when the clutch is used to transmit rotary motion. When the clutch is used as a brake or backstopping mechanism to prevent backward rotation, one member will be stationary. When the shaft is rotated counterclockwise, as shown by the arrow in FIG. 1, rollers 20 are also moved counterclockwise, thus moving along the ramps 16 toward the circumferential position of smallest separation between the shaft and the case. The smallest separation between the shaft and the casing is less than the diameters of the rollers thus causing the rollers to become locked thereby locking the shaft to the case so that the rotatable case rotates with the shaft. When the clutch is used as a backstopping device, both members become stationary when the clutch becomes locked up.

When the shaft 10 is rotated in the clockwise direction, rollers 20 are moved circumferentially along the ramp 16 toward the position of greatest separation between the shaft and the case 12 and against the stops 18. Since the area of greatest separation between the shaft and the race is greater than the diameter of the rollers, the overrunning clutch becomes unlocked and the shaft is rotated clockwise within the case.

Alternatively, the case 12 may be rotated relative to shaft 10 to cause lockup or overrunning.

Figure 2:
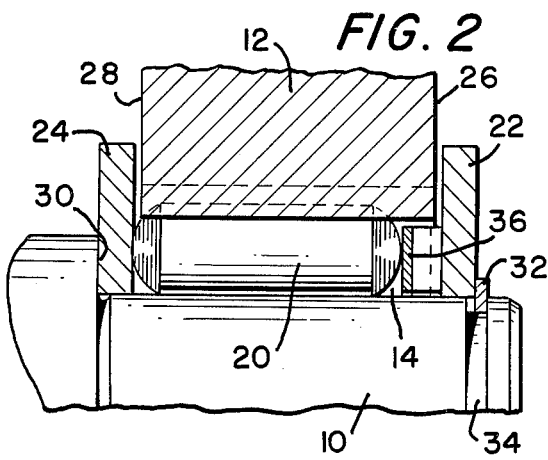
FIG. 2 is a fragmentary longitudinal view, partly in section, showing my invention.

As shown in FIG. 2, my new invention includes a pair of axially spaced annular stops 22 and 24. In the embodiment of FIG. 2, the stops extend radially from the shaft 10 across the annular space 14 and along the front and back sides 26 and 28, respectively, of the case 12. The stops need not necessarily extend fully across the annular space. The axial position of the stop 24 is fixed by the annular shoulder 30 on the shaft 10. The axial position of the stop 22 is fixed by a snap ring 32 fitted in the annular groove 34 on shaft 10. Other appropriate means for holding the stop 22 in position may be used.

Biasing means such as a wavey spring 36 is located between the stop 22 and an axial end of the rolling members 20.

Figures 3, 5:
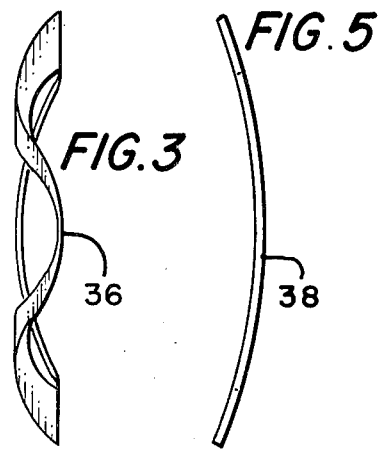
FIG. 3 is a side view of the wavey spring used in the embodiment of FIG. 2.
FIG. 5 is a side view showing the bow spring used in the modification of FIG. 4.

The detailed structure of wavey spring 36 is shown in FIG. 3.

The wavey spring 36 urges one or more of the rollers 20 in an axial direction against the stop 24. This axial force is sufficient to cause the urged rollers 20 to be carried along in the same direction as the direction of rotation of the shaft. Thus, the rollers 20 contacted by the wavey spring 36 are carried along in the same direction as the rotation of the shaft and exert a circumferential force on the intermediate rollers to either lock or unlock the overrunning clutch depending upon the direction of rotation of the shaft. With outer race rotation about a stationary shaft, the rollers merely stay in position on the shaft until contacted by the clutch ramps and wedged between ramps and shaft.

Figure 4:
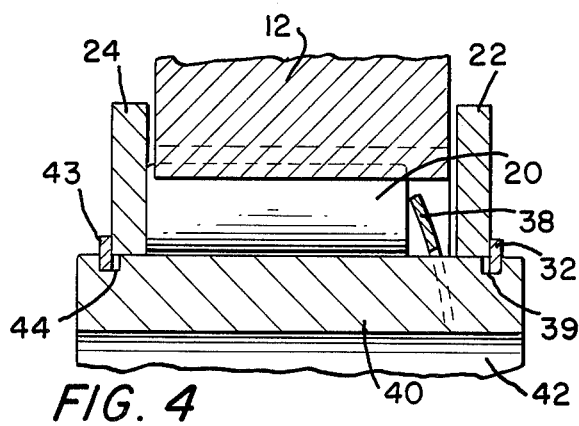
FIG. 4 is a fragmentary longitudinal view, partly in section, showing a modification of my invention.

In the embodiment shown in FIG. 4, instead of a wavey spring, a curved washer 38 is located axially between an edge of the roller 20 and the annular stop 22. Also, instead of the inner race consisting of a shaft, the inner race 40 is provided with a longitudinal bore 42 which inturn is mounted on a rotatable shaft (not shown). The annular stop 24 is located on the inner race 40 by an annular ring 43 located in the annular groove 44 of the race 40.

The curved washer 38 is shown in more detail in FIG. 5. Though the curved washer is shown as used with a square edged roller, it could also be used with rounded edged rollers. Actually, in all of the modifications shown, the spring biasing members may be used with various types of rollers such as square edged rollers, rounded edged rollers, and trunnion rollers.

Figure 6:
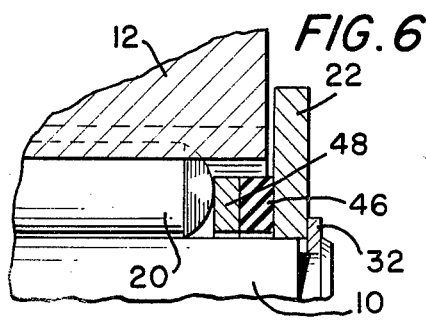
FIG. 6 is a fragmentary longitudinal view; partly in section, of a further modification of my invention.

In the embodiment shown in FIG. 6, a resilient annular member 46 and a flat washer 48 are shown mounted about the shaft 10 and axially between the edge of the rollers 20 and the annular stop 22. The flat washer 48 may be made of metal or plastic. The resilient annular member 46 may be made of resilient rubber or a resilient plastic or resilient metal spring. The resilient axial member 46 exerts the axial force against the flat washer 48 which in turn transmits the axial force against the rollers 20. The flat washer 48 is included because often the rollers slide circumferentially and the life of the resilient annular member 46 may be increased if the edges of the rollers do not directly engage the resilient annular member 46. Of course, if desired and/or if there is little or no sliding motion of the rollers 20, the flat washer may be removed so that the rollers directly engage the resilient annular member 46. Also if desired, a flat washer may be inserted between the spring and rollers of all the other embodiments.

Figure 7:
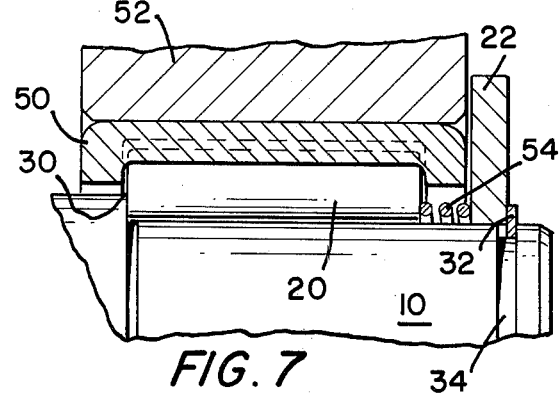
FIG. 7 is a fragmentary longitudinal view, partly in section, showing a still further modification of my invention.

In the embodiment shown in FIG. 7, my new invention is shown used with a drawn-cup-type outer member 50 which is mounted in a housing 52. As shown by broken lines, ramps used as cam surfaces are provided in the inside of the drawn cup 50. A coil spring 54 is used as the biasing member. The coil spring is wrapped around the shaft 10 with its edges contacting the stop 22 and the edge of the roller 20.

Figure 8:
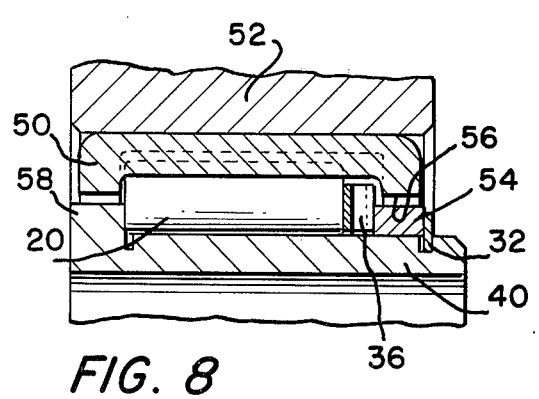
FIG. 8 is a fragmentary longitudinal view, partly in section, showing a still further modification of my invention.

In the embodiment shown in FIG. 8, the stop member 54 is a ring member with an outside diameter less than the smallest inside diameter of the drawn-cup 50 and thus fits in the space between the race 40 and the bore 56 of the drawn cup. The wave spring 36 bears against the edge of the roller 20 and against the edge of the annular stop 54. The second stop member is an annular shoulder 58 extending from and integral with the race 40.

Figure 9:
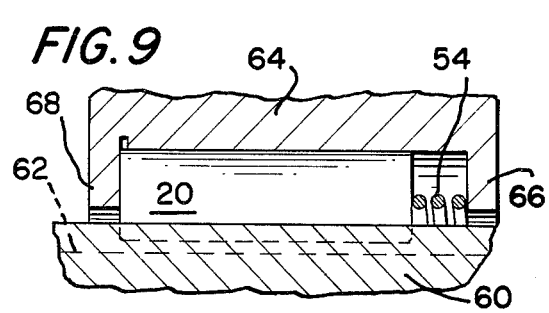
FIG. 9 is a fragmentary longitudinal view, partly in section, showing a modification of my invention with the cam surface on the inner race rather than the outer race.

In the embodiment shown in FIGS. 1 through 8, the cam surfaces are located on the outer member or race. However, if desired, the cam surfaces can be provided on the inner member or inner race. One such arrangement is shown in FIG. 9. In this figure, the shaft 60 is provided with the ramps 62 (shown in broken lines). The outer member 64 is provided with axially spaced integral stops 66 and 68. These stops may equally well be separate pieces held to the outer clutch member.

When the outer member 64 is rotated, the coil spring 54 exerts a force against the edge of rollers 20 so that the rollers 20 are carried along in the same rotational direction as the rotational direction of the housing 64. Thus, the rollers will be moved to the locked position or the unlocked position, depending upon the rotational direction of the housing 64. Alternatively, the inner member with the cams may be rotated to cause lockup.

I claim:

1. In an overrunning clutch with an inner member and an outer member, the outside diameter of the inner member being less than the inside diameter of the outer member to provide an annular space between said members, one of said members having a roller member race and the other of said members having a cam surface, the improvement comprising: a pair of axially separated stops on said roller member race; a plurality of rolling members located between the pairs of stops and within the annular space between the inner member and the outer member; said rolling members filling said annular space and adapted to contact one another; and a spring axially located between one of the stops and the rolling members, said spring being in direct contact with at least one of the rolling members and adapted to urge said at least one of the rolling members in an axial direction against the other stop whereby the rolling members urged by the spring will be carried along with the roller member race and will be circumferentially moved by relative rotation of the inner member and outer member to move the rolling members along the cam surface.

2. An overrunning clutch in accordance with claim 1 wherein, the spring is a wave spring.

3. The overrunning clutch of claim 1 wherein the spring is a curved washer.

4. An overrunning clutch in accordance with claim 1 wherein the spring is a coil spring.

5. An overrunning clutch in accordance with claim 1 wherein the cam surface is provided on the outer member.

6. An overrunning clutch in accordance with claim 1 wherein the cam surfce is provided on the inner member.

* * * * *